US008726521B2

(12) United States Patent
Hauser

(10) Patent No.: US 8,726,521 B2
(45) Date of Patent: May 20, 2014

(54) APPLE WEDGER

(75) Inventor: Lawrence Michael Hauser, Auburn, WA (US)

(73) Assignee: Progressive International Corporation, Kent, WA (US)

( * ) Notice: Subject to any disclaimer, the term of this patent is extended or adjusted under 35 U.S.C. 154(b) by 224 days.

(21) Appl. No.: 13/283,887

(22) Filed: Oct. 28, 2011

(65) Prior Publication Data

US 2012/0102760 A1 May 3, 2012

Related U.S. Application Data

(60) Provisional application No. 61/407,761, filed on Oct. 28, 2010.

(51) Int. Cl.

| | |
|---|---|
| ***A23N 4/14*** | (2006.01) |
| ***B26B 3/04*** | (2006.01) |
| ***B26D 1/12*** | (2006.01) |
| ***B26D 3/26*** | (2006.01) |

(52) U.S. Cl.
USPC .................................. 30/114; 30/302; 99/537

(58) Field of Classification Search
USPC ........... 30/114, 117, 302, 303, 304, 305, 315, 30/316; D7/673; 99/537; 83/932
See application file for complete search history.

(56) References Cited

U.S. PATENT DOCUMENTS

| | | | | |
|---|---|---|---|---|
| 52,740 | A | 2/1866 | Onderdonk | |
| 1,744,422 | A * | 1/1930 | Taylor | 30/302 |
| 1,962,737 | A * | 6/1934 | Gutmann | 30/173 |
| 3,116,770 | A | 1/1964 | Tanuma | |
| 4,852,256 | A * | 8/1989 | Schoettler | 30/114 |
| 4,959,903 | A * | 10/1990 | Daoust et al. | 30/123.5 |
| 6,276,918 | B1 * | 8/2001 | Slaughter et al. | 425/289 |
| 6,805,032 | B2 * | 10/2004 | Engdahl | 83/597 |
| 6,834,579 | B2 * | 12/2004 | Kuan | 99/588 |
| D535,164 | S | 1/2007 | St. Germain et al. | |
| 7,266,894 | B1 * | 9/2007 | Hinckley | 30/302 |
| D576,454 | S * | 9/2008 | Repac | D7/693 |
| 7,836,822 | B2 * | 11/2010 | Cheng | 99/565 |
| 7,992,476 | B2 * | 8/2011 | Kaposi | 83/167 |
| 8,046,921 | B2 * | 11/2011 | Mastroianni | 30/114 |
| D650,247 | S * | 12/2011 | Harris et al. | D7/673 |
| D687,267 | S * | 8/2013 | Harris et al. | D7/673 |
| 2009/0249965 | A1 * | 10/2009 | Hauser | 99/552 |
| 2009/0282990 | A1 * | 11/2009 | Farnum et al. | 99/537 |
| 2012/0102760 | A1 * | 5/2012 | Hauser | 30/302 |
| 2012/0131800 | A1 * | 5/2012 | Hauser et al. | 30/124 |

FOREIGN PATENT DOCUMENTS

| | | | |
|---|---|---|---|
| DE | 102007042660 | | 11/2009 |
| EP | 0 102 330 | * | 3/1984 |
| GB | 2312613 | | 11/1997 |

* cited by examiner

*Primary Examiner* — Hwei C Payer
(74) *Attorney, Agent, or Firm* — Lowe Graham Jones PLLC

(57) ABSTRACT

An apple wedger for cutting fruits or vegetables into wedges or other desired shapes includes a slicer and a pusher, in which the slicer has a peripheral frame and internal cutting blades. The pusher is configured to be used to push at least partially sliced food items through the gaps between cutting blades. In some versions, the pusher is pivotally attached to the slicer.

13 Claims, 4 Drawing Sheets

APPLE WEDGER

PRIORITY CLAIM

This application claims the benefit of prior U.S. provisional application Ser. No. 61/407,761 filed Oct. 28, 2010, the contents of which are hereby incorporated by reference.

FIELD OF THE INVENTION

This application relates to slicing devices, particularly including devices for slicing fruits and vegetables.

BACKGROUND OF THE INVENTION

Devices for cutting apples into sections have been available for many years. In a typical device, several radial blades are supported by a central hub blade and an outer frame. As the device is pushed downward over an apple, the central hub blade cuts the core into a central cylinder while the radial blades divide the remaining apple into several wedge-shaped sections.

Unfortunately, the current devices can be difficult to use because they do not readily push all the way through an apple or other food item. The skin of an apple, for example, may provide resistance against a complete cut. This leads to users pushing against the final bit of apple with their fingers, risking a cut or injury as the fingers come into contact with the blade.

SUMMARY OF THE INVENTION

A preferred example of the invention includes a slicer and a pusher, in which the slicer has a peripheral frame and internal cutting blades. The pusher is configured to be used to push at least partially sliced food items through the gaps between cutting blades.

In a preferred version of the invention, the device is configured to cut fruits into wedges and therefore the cutting blades are arranged in a radial fashion with substantially wedge-shaped gaps between blades.

In other versions of the invention, the blades may be arranged in a grid fashion, creating square, rectangular, or other shaped openings. In either case, for the sake of simplicity, the device will be referred to as an apple wedger.

In some examples the pusher is hingedly attached to the slicer so that it can swing away from or toward the slicer in a pivotal fashion. When pivoted toward the slicer, raised projections on the pusher are urged into the openings between blades to push through any food items remaining in those openings.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
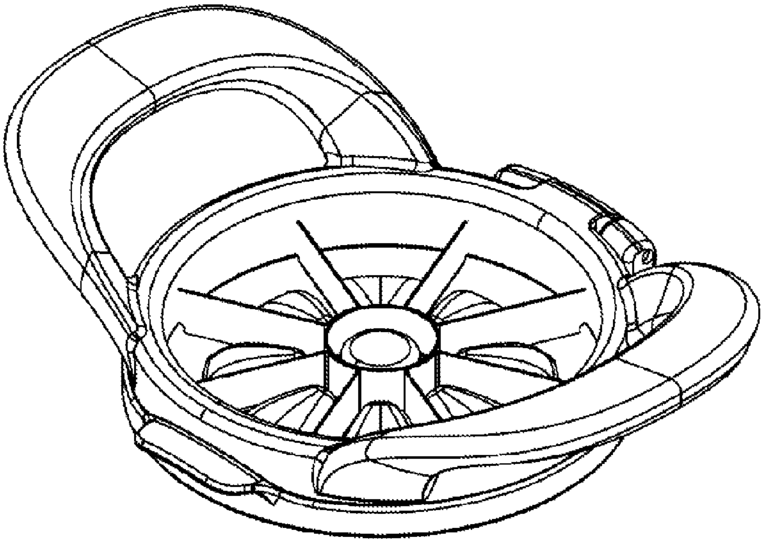
FIG. 1 is a perspective view of a preferred apple wedger, shown with a slicer and a pusher in a closed position.

A preferred version of the apple slicer and wedger is shown in the Figures as described below. As illustrated, the wedger includes a slicer 10 and a pusher 100 pivotally secured to the slicer.

The slicer includes a peripheral frame 20 that is preferably formed in a ring or circular shape. In some alternate versions, the frame may be square or have a different shape other than circular. In a preferred example, the frame is rigid and formed from plastic, stainless steel, or other materials of sufficient strength to withstand the force imparted by urging the blades through an apple.

The blade portion of the slicer includes a central ring blade 30 and several radial blades 40 spanning the distance between the ring blade and the frame. Because the ring blade is located substantially at the center of the frame, each of the radial blades is substantially identical and divides the annular space between the frame and ring blade into equal wedge-shaped sections. In a preferred version the ring blade and radial blades are formed from stainless steel and welded or otherwise permanently secured to one another.

As best seen in the top perspective view, each of the blades 40 includes a sharpened lower edge 41. Likewise, the central ring blade includes a sharpened lower edge.

The frame may optionally include a pair of handles 50, 52 to aid in pushing the blades downward against an apple or other fruit. In the version as illustrated, the handles are diametrically opposite one another and oriented with distal ends that are raised above the plane of the blades and the rest of the frame, extending generally away from the sharpened edge of the blades. In other versions handles may be formed as a peripheral flange and need not be above the plane of the blades. Still further, in some versions the handle may include a soft grip which, for example, may be in the form of a resilient material over-molded onto a more rigid handle foundation.

The pusher 100 is configured for pivotal attachment to the slicer, preferably being attached at a hinge located along an edge of each of the pusher and slicer. Thus, in the preferred example the pusher and slicer each include complementary loops positioned and configured to receive a pin 70 that serves as an axis of rotation. As shown, the slicer 10 preferably includes a single loop 60 that is positioned between a pair of loops 110, 112 formed on the perimeter of the pusher. The loops are each configured with a central bore to receive the pin, thereby allowing the pusher and slicer to pivot about the pin with respect to one another. In alternate version of the invention, a variety of other configurations may be used to enable the pusher to pivot with respect to the slicer.

In the illustrated version, the hinge is formed at an upper end of the frame 20, and therefore the loops 110, 112 are positioned above the bottom of the pusher. In this configuration, the pin 70 forming the pivot axis is positioned at or above the top surface of the raised projections of the pusher. This positioning of the pivot axis allows a fuller rotation of the pusher before it contacts the food at the bottom of the slicer, thereby providing a more even force against the food rather than a force initially applied at the side adjacent the hinge.

In yet other versions, the pusher and slicer are not pivotally attached to one another, and in such versions the loops and pin are not used. The pivotal attachment is preferred, however, for ease of use and to retain the two components together for easy storage. Most preferably, each of the pusher and the slicer has a substantially circular perimeter, with the pusher and slicer being pivotally attached to one another at a location on the perimeter.

The pusher 100 is shaped with a perimeter that generally matches that of the slicer. Thus, most preferably the pusher is circular and includes an upwardly extending peripheral flange 120. In a version in which the perimeter of the blade is square or otherwise shaped, preferably the pusher has a corresponding perimeter. The frame 20 of the slicer 10 preferably is also formed with an outer sidewall that includes a complementary channel or other surface that is sized and configured to receive the flange when the pusher is pivoted to a position in which the pusher is closed snugly against the slicer. Thus, the outer perimeter of the slicer is seated just within the flange of the pusher when the two components are pivoted together.

In the version as illustrated, rather than a complementary channel formed along a lower edge of the frame, the outer sidewall of the frame 20 includes an upper portion 23 and a lower portion 22, with the lower portion being recessed radially inward with respect to the upper portion. Accordingly, the diameter of the upper portion is somewhat larger than the lower portion, with a shoulder 21 defined at the transition between the upper and lower portions. The diameter of the outer surface of the lower portion of the frame is sized to snugly receive the inner surface of the peripheral flange 120 of the pusher when the pusher is pivotally rotated into a position closely adjacent the slicer.

The pusher further includes an interior floor portion that is generally planar, transitioning to several raised projections sized and positioned to fit in the spaces between the blades. The projections are raised in an upward direction that extends toward the slicer when the pusher is rotated into a closed position adjacent the slicer.

In the version as shown, there are eight radial blades 40 that define eight wedge-shaped spaces between the blades. Likewise, the pusher includes eight raised projections 140 that are positioned to fit between a respective one of the wedge-shaped spaces. In other versions, the device includes a greater or lesser number of blades and therefore a greater or lesser number of projections so that a projection is positioned between each pair of blades.

The projections 140 as shown in the preferred version have a height that is greatest adjacent the center of the pusher and somewhat rounded and tapered to a lower height toward the ends of the projections that are radially outward from the center. This greater height at the middle provides for a stronger pushing force at the center, where the greatest force may be required. In other versions, the height of the projections may be substantially the same across the entire top surface of the projection.

A central hub projection 130 is provided at the center of the pusher, positioned and shaped to fit within the ring blade 30. Thus, the hub projection is generally cylindrical in shape, though with slightly rounded corners to more readily fit within the ring blade and to provide for greater tolerance as the pusher rotates into contact with the slicer.

In the version as shown, the device is configured as an apple wedger that removes a core of an apple while slicing the remainder of the apple into wedge-shaped pieces. Accordingly, the pusher is configured with a central hub and eight wedge-shaped projections (when viewed from the top or bottom), each of the wedge-shaped projections being arranged circumferentially about the central hub.

In alternate versions, a greater or lesser number of wedge-shaped projections may be used. Likewise, the slicer and pusher may be formed without a central ring blade and corresponding hub, thereby forming a slicer that does not simultaneously separate the core from the fruit. In such a version, the blades 40 are simply joined substantially at the center of the slicer to form a plurality of wedges.

In yet other versions, the slicer includes a plurality of blades arranged perpendicularly to form a grid of squares which may be used to cut a potato into French fries or other such shapes. As still another version, the slicer may include a plurality of blades oriented parallel to one another to create slices, but without the orthogonal blades forming a grid as noted above, or with only a single blade perpendicular to the group of parallel blades in order to provide structural support. In the preferred implementation of each of the preferred versions the pusher includes projections sized and oriented to fit between the spaces separating the blades.

At a location diametrically opposite the hinge joining the pusher and slicer, the pusher includes a radial lip 150 sufficiently large to be engaged by a thumb or finger in order to separate the pusher from the slicer. The slicer and pusher may each further include a projection such as tongue 162 and a shoulder such as groove 160 or other such complementary surfaces that form a lock to retain the pusher against the slicer for storage (in the position as shown in FIG. 1), thereby requiring a small separation force to detach the tongue from the groove to rotate the pusher pivotally away from the slicer. The tongue and groove feature is provided on the inner face of the flange 120 and outer face of the sidewall of the frame 20, positioned at complementary locations.

In the version as shown, the shoulder between the upper and lower portions of the peripheral sidewall of the frame 20 includes an upwardly scalloped edge 24 to accommodate the tongue and groove feature. Likewise, the lip 150 is positioned at a raised location along the outer flange 120 of the pusher.

Figure 2:
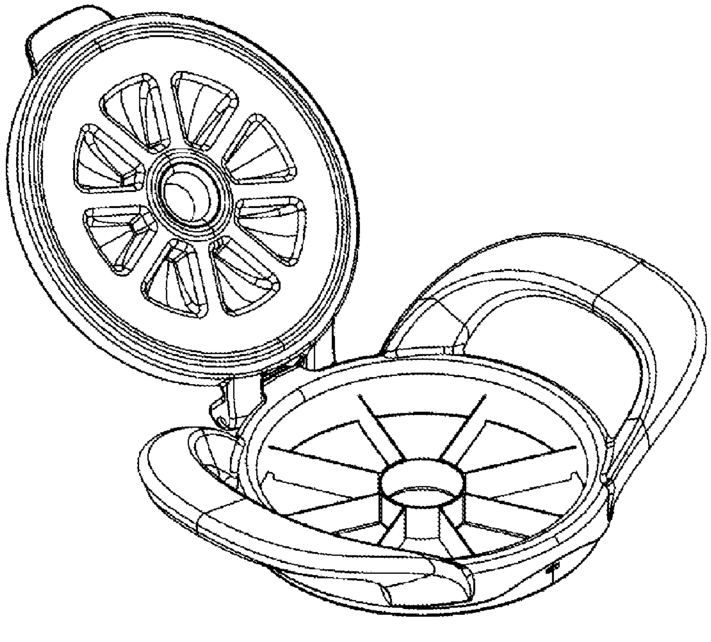
FIG. 2 is a perspective view of the apple wedger of FIG. 1, shown with the pusher in an open position.

In use, the slicer is placed against an apple or other food item. In the case of an apple, the slicer is preferably positioned such that the central ring blade is coaxial with an axis extending through the core of the apple from the stem to the blossom. The slicer is pushed downward against the apple, thereby separating the apple into wedges and forming a central cylinder segment that contains the majority of the core. In this initial operation of the slicer, the pusher is pivoted away from the slicer, preferably at an obtuse angle, so that it does not interfere with the slicing action. This orientation of the pusher with respect to the slicer is shown in FIG. 2, in which the pusher has been pivoted away from the slicer through an arc of more than 180 degrees with respect to its initial position as illustrated in FIG. 1. Most preferably, the pusher may be rotated about 225 degrees away from its resting or storage position in FIG. 1 in order to facilitate slicing. A suitable configuration, however, is one in which the pusher can simply be rotated away from the slicer sufficiently to allow the slicer to be pressed fully downward onto a horizontal surface while the pusher is rotated laterally away from the slicer. Such a rotation would be about 180 degrees, and perhaps slightly more or less depending on the position and configuration of the hinge. In the illustrated example, the hinges are positioned on the upper end of the frame and therefore a rotation of the pusher of less than 180 degrees will effectively move the pusher out of the area defined by an arc of 180 degrees with respect to the slicer. Thus, a rotation of "about" 180 degrees should be understood to include a somewhat smaller path of rotation as long as it allows the slicer to be pressed onto a horizontal surface with the pusher attached.

As noted above, the initial slicing is performed with the pusher rotated away from the slicer. Thus, the initial slicing is done by pressing the slicer downward against a food item and toward a countertop or cutting board while the pusher is rotated away.

Figure 3:
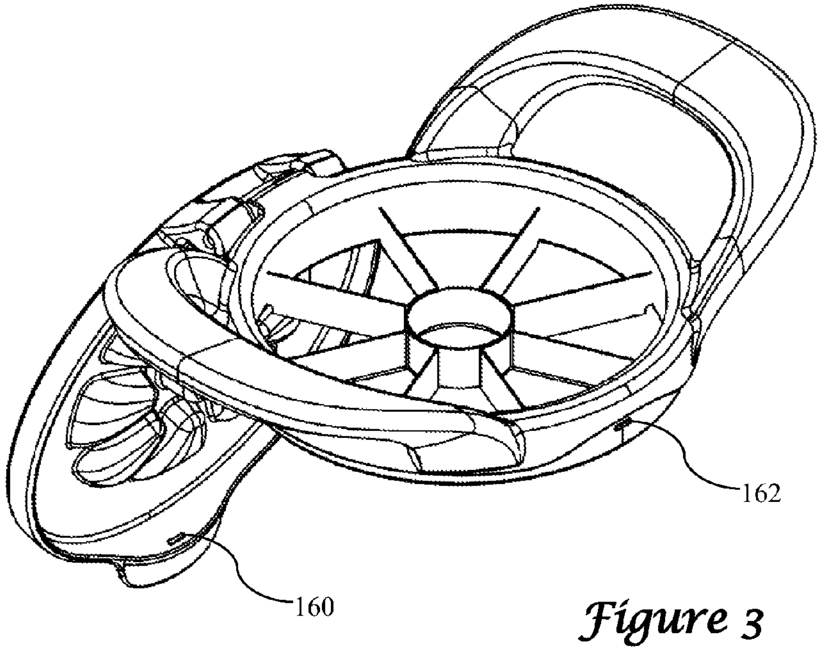
FIG. 3 is a perspective view of the apple wedger of FIG. 1, shown with the pusher in an intermediate position.
Figure 4:
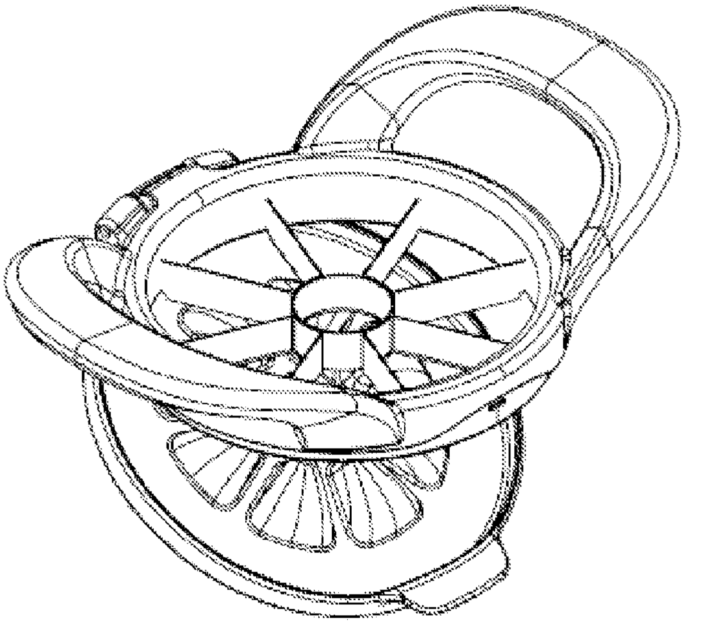
FIG. 4 is a perspective view of the apple wedger of FIG. 1, shown with the pusher in an intermediate position, nearly in the closed position.
Figure 5:
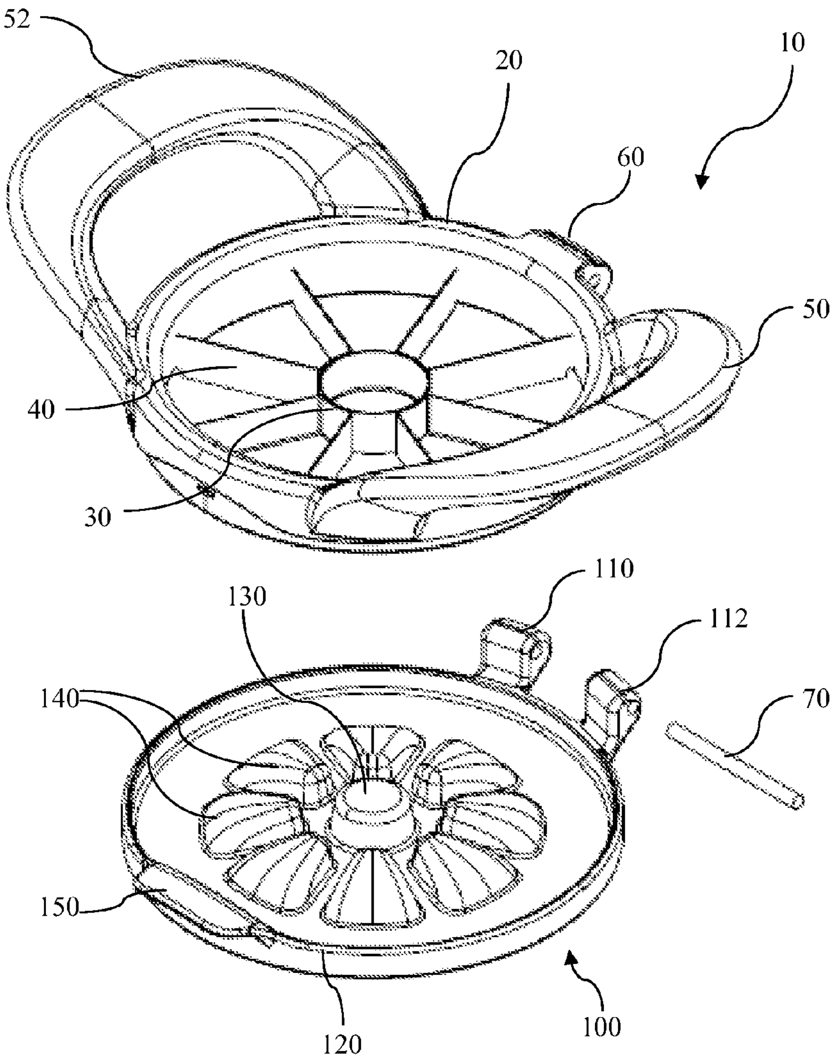
FIG. 5 is an exploded view of the apple wedger of FIG. 1.
Figure 6:
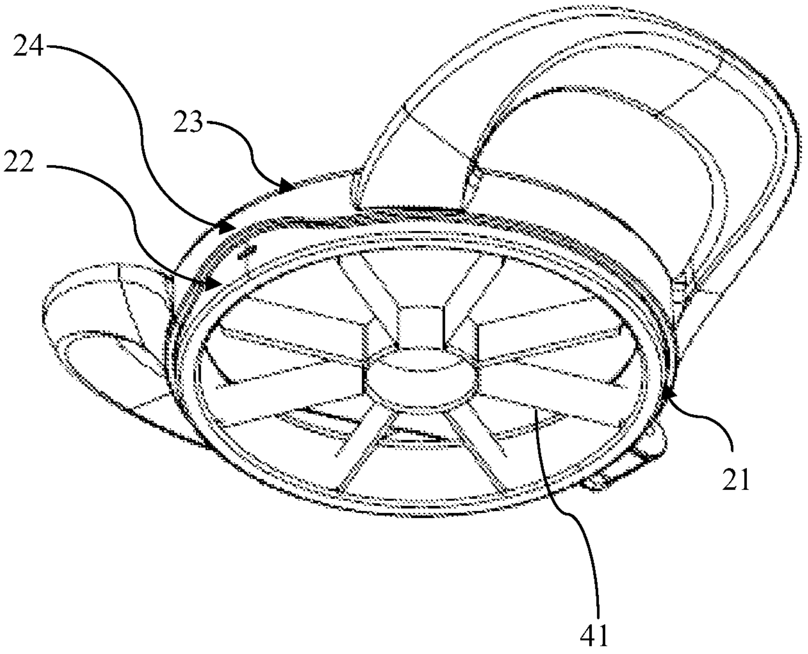
FIG. 6 is a bottom perspective view of the apple wedger of FIG. 1.

At the termination of the slicing action, a portion of the meat and skin of the apple may not be fully sliced. In such a case, the pusher is rotated toward a closed position, adjacent the slicer. The path of rotation is shown in FIGS. 3 and 4, which illustrate intermediate positions of the pusher as it is progressively pivoted toward the slicer. As the pusher is rotated toward a fully closed position (as in FIG. 1), the raised projections of the pusher are urged into the spaces between the blades, thereby pushing any remaining bits of apple further through the spaces defined between the blades. Once the pusher is fully rotated to a closed position adjacent the slicer, the apple will be fully sliced by the blades and pushed into a position fully separated from the blades.

In some versions, the slicer may include a receptacle attached to the slicer and positioned to receive sliced bits as they are pushed upward and through the blades. Ideally, the receptacle is removably attached to the frame of the slicer, to allow the slices to be accessed readily after slicing. This version is intended to be used in a fashion as described above, first pressing the slicer through the food item and against a cutting board or countertop, then swinging the pusher around to push the remaining bits through the blades.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are define as follows:

1. An apple cutting device, comprising:

a slicer having a peripheral frame defining an interior space;

a plurality of blades spanning the interior space, the plurality of blades defining a plurality of sections between the plurality of blades, the plurality of blades further comprising a central circular hub blade and a plurality of radial blades extending from the central hub blade to the frame; and a pusher pivotally secured to the frame, the pusher being rotatable with respect to the slicer between a first position in which the pusher is adjacent the slicer and a second position in which the pusher is rotated at an angle of about 180 degrees, the pusher further having a plurality of raised projections configured to be received within the plurality of sections when the pusher is in the first position;

the plurality of raised projections further comprising a central hub projection and a plurality of wedge-shaped projections surrounding the central hub projection, the wedge-shaped projections each comprising a first end adjacent the central hub projection and a second end radially outward from the first end, the first end being taller than the second end;

whereby when the pusher is rotated to the first position the slicer can be pressed fully downward onto a horizontal surface to slice an apple.

2. The apple cutting device of claim 1, wherein the pusher further comprises a base and a peripheral flange, the plurality of raised projections and the peripheral flange extending upward from the base.

3. The apple cutting device of claim 2, wherein the frame is received within the flange when the pusher is in the first position.

4. The apple cutting device of claim 3, further comprising a lock for securing the pusher to the slicer in the first position.

5. The apple cutting device of claim 1, further comprising a pair of handles, each of the pair of handles being positioned diametrically opposite the other.

6. The apple cutting device of claim 1, wherein the frame has a top end and a bottom end, the pusher being pivotally secured to the frame at a hinge, wherein the hinge is positioned at the top end of the frame.

7. The apple cutting device of claim 6, wherein the pusher is pivotable about an angle of greater than 180 degrees.

8. The apple cutting device of claim 7, wherein the pusher is pivotable about an angle of greater than 225 degrees.

9. An apple cutting device, comprising:

a slicer having a peripheral frame defining an interior space;

a plurality of blades spanning the interior space and supported by the frame, the plurality of blades defining a plurality of sections between the plurality of blades;

a pusher pivotally secured to the frame, the pusher being rotatable with respect to the slicer between a first position in which the pusher is adjacent the slicer and a second position in which the pusher is rotated at an angle of about 180 degrees, the pusher further having a base and a plurality of raised projections formed on the base, the plurality of raised projections configured to be received within the plurality of sections when the pusher is in the first position; and a projection formed on one of the pusher or the slicer and a complementary shoulder formed on the other one of the pusher or the slicer, whereby the projection is received by the shoulder to hold the pusher in the first position.

10. The apple cutting device of claim 9, wherein the plurality of blades further comprises a central circular hub blade and a plurality of radial blades extending from the central hub blade to the frame.

11. The apple cutting device of claim 9, wherein the plurality of raised projections further comprises a central hub projection and a plurality of wedge-shaped projections surrounding the central hub projection.

12. The apple cutting device of claim 9, further comprising a tab extending laterally away from the pusher for grasping the pusher, whereby the tab facilitates separation of the projection from the shoulder.

13. A method for cutting an apple, comprising:

providing an apple cutting device in accordance with claim 9;

rotating the pusher into the second position;

pressing the slicer downward through the apple; and rotating the pusher into the first position, whereby the apple is fully pushed through the slicer.

* * * * *